United States Patent
Wright

(10) Patent No.: US 9,725,348 B2
(45) Date of Patent: Aug. 8, 2017

(54) METHOD TO PROVIDE AN OPTIMIZED ORGANIC LOAD TO A DOWNSTREAM-WASTEWATER TREATMENT PROCESS

(71) Applicant: ClearCove Systems, Inc., Victor, NY (US)

(72) Inventor: Terry Wright, Rochester, NY (US)

(73) Assignee: ClearCove Systems, Inc., Victor, NY (US)

( * ) Notice: Subject to any disclaimer, the term of this patent is extended or adjusted under 35 U.S.C. 154(b) by 251 days.

(21) Appl. No.: 14/801,641

(22) Filed: Jul. 16, 2015

(65) Prior Publication Data
US 2016/0304379 A1    Oct. 20, 2016

Related U.S. Application Data

(63) Continuation-in-part of application No. 14/691,062, filed on Apr. 20, 2015.

(51) Int. Cl.
*C02F 11/02*    (2006.01)
*C02F 11/12*    (2006.01)

(52) U.S. Cl.
CPC ........ *C02F 11/12* (2013.01); *C02F 2209/006* (2013.01); *C02F 2209/08* (2013.01); *C02F 2209/10* (2013.01); *C02F 2209/11* (2013.01)

(58) Field of Classification Search
CPC combination set(s) only.
See application file for complete search history.

(56) References Cited

U.S. PATENT DOCUMENTS 6,080,305 A    6/2000    Sandahl

*Primary Examiner* — Dirk Bass
(74) *Attorney, Agent, or Firm* — Harris Beach PLLC; Neal L. Slifkin

(57) ABSTRACT

A method for providing an optimized organic load to a downstream wastewater treatment process includes the steps of: providing a primary wastewater treatment plant including an organic harvester (OH) with an OH effluent output stream with temporal variation in organic content, a sludge filtrate outflow from the primary wastewater treatment plant, a valve controlled by a controller, and a sensor communicatively coupled to the controller, the sensor disposed downstream of a combined outflow line to measure an organic content of a combined outflow to the downstream wastewater treatment process; sensing the organic content of the combined outflow to the downstream wastewater treatment process; adjusting the valve controlled by the controller to maintain about a setpoint organic content concentration of the combined outflow to the downstream wastewater treatment process by supplementing the OH effluent output stream with organically rich matter from the sludge filtrate outflow.

20 Claims, 10 Drawing Sheets

LEGEND

1 - Plant Influent
2 - Organic Harvester Influent
3 - Organic Harvester Effluent
4 - Primary Effluent Forcemain
5 - Anoxic Influent
6 - Aerobic Tank Effluent
7 - Plant Effluent
8 - Nitrate Recycle
9 - Return Activated Sludge (RAS)
10 - Waste Activated Sludge (WAS)
11 - Thickener Effluent
12 - CCS Sludge Thickener Effluent
13 - Primary Digester Feed
14 - Secondary Digester Effluent
15 - Dewatered Sludge
16 - WAS Thickener Underflow
17 - CCS Slued Thickener Underflow
18 - Belt Press Underflow

FIG. 7C

METHOD TO PROVIDE AN OPTIMIZED ORGANIC LOAD TO A DOWNSTREAM-WASTEWATER TREATMENT PROCESS

CROSS-REFERENCE TO RELATED APPLICATIONS

This application is a Continuation in Part of and claims priority to and the benefit of co-pending U.S. patent application Ser. No. 14/691,062, AUTOMATIC CONTROL OF BIOCHEMICAL OXYGEN DEMAND CONTENT (BOD) OF SLUDGE AND OTHER PRODUCTS OF A WASTE WATER TREATMENT SYSTEM, filed Apr. 20, 2015, which application is incorporated herein by reference in its entirety.

FIELD OF THE APPLICATION

The application relates to waste water treatment and particularly to control of an organic harvester effluent flow to a downstream treatment process.

BACKGROUND

Waste water treatment systems, such as municipal waste water treatment plants accept biochemical oxygen demand content (BOD) rich waste fluids. Unfortunately, prior art treatment facilities allow useful BOD content that could be recycled, such as for energy generation applications, to pass into downstream biological processes while filtering out undesired solid materials in the waste stream. Also, such facilities typically run without regard to optimizing recovery of BOD materials. Such facilities generally run all of the time, and only adjust or divert influent fluid streams when an influent flow rate exceeds a maximum flow rate that a given wastewater facility can handle.

SUMMARY

According to one aspect, a method for providing an optimized organic load to a downstream wastewater treatment process includes the steps of: providing a primary wastewater treatment plant including an organic harvester (OH) with an OH effluent output stream with temporal variation in organic content, a sludge filtrate outflow from the primary wastewater treatment plant, a valve controlled by a controller, and a sensor communicatively coupled to the controller, the sensor disposed downstream of a combined outflow line to measure an organic content of a combined outflow to the downstream wastewater treatment process; sensing the organic content of the combined outflow to the downstream wastewater treatment process; adjusting the valve controlled by the controller to maintain about a setpoint organic content concentration of the combined outflow to the downstream wastewater treatment process by supplementing the OH effluent output stream with organically rich matter from the sludge filtrate outflow.

In one embodiment, the step of providing a sensor includes providing an ultraviolet absorption spectrometer (UVAS) sensor.

In another embodiment, the step of providing a sensor includes providing a total suspended solids (TSS) or a chemical oxygen demand (COD) sensor.

In yet another embodiment, the step of providing a sensor further includes providing a chemical sensor selected from the group consisting of nitrogen sensor, ammonia sensor, and phosphorous sensor.

In yet another embodiment, the step of adjusting includes adjusting the valve to maintain a steady organic matter concentration delivered to the downstream process.

In yet another embodiment, the step of adjusting includes adjusting the valve to deliver an optimized organic concentration to the downstream process in response to a measured chemical content of the OH effluent stream.

In yet another embodiment, the step of sensing includes sensing a COD concentration of the combined outflow to the downstream wastewater treatment process.

In yet another embodiment, the step of providing a valve includes providing a proportional valve.

In yet another embodiment, the step of adjusting the valve includes proportionally adjusting the proportional valve over a continuous range from closed to open.

In yet another embodiment, the step of providing an OH effluent output stream includes providing an organically rich flow from an enhanced primary treatment EPT tank screen box (SBX).

In yet another embodiment, the step of providing a controller includes providing a supervisory control and data acquisition (SCADA) controller.

In yet another embodiment, the step of providing a sludge filtrate outflow from the primary wastewater treatment plant includes providing a RDT filtrate outflow from a rotary drum thickener (RDT).

In yet another embodiment, the step of providing a sludge filtrate outflow from the primary wastewater treatment plant includes providing an organically rich filtrate from a selected one of the group consisting of a gravity thickening apparatus, a gravity belt apparatus, and a centrifuge apparatus.

In yet another embodiment, the downstream wastewater treatment process includes an anaerobic digester.

In yet another embodiment, the step of adjusting the valve includes adjusting the valve to provide a substantially constant organic load selected from the group consisting of carbon content, digestible content, bio-degradable content, organic content, bio mass, and BOD load.

In yet another embodiment, the step of adjusting the valve includes adjusting the valve to compensate for a measured concentration type of the group consisting of nitrogen, ammonia, and phosphorous.

In yet another embodiment, the step of adjusting the valve includes adjusting the valve to provide a substantially constant organic load based on a solids measurement.

In yet another embodiment, the step of providing includes providing a controller running a predictive process algorithm which predictively adjusts the setpoint organic content concentration to address a cyclical natural human habit or a scheduled internal treatment process.

According to another aspect, a method for providing a steady organic load to a downstream wastewater treatment process includes the steps of: providing a primary wastewater treatment plant including an organic harvester (OH) with an OH effluent output stream which varies in organic content over a diurnal cycle, a mechanized device to position a screen box (SBX) at a height in a decanting tank where the OH effluent output stream is sourced from the SBX, and a sensor communicatively coupled to a controller, the sensor disposed in a combined outflow line to measure an organic content of a combined outflow to the downstream wastewater treatment process; sensing the organic content of the combined outflow to the downstream wastewater treatment process; adjusting the height of the SBX by the controller to maintain an organic content concentration of the OH effluent output stream at about a setpoint organic content concentration value.

In one embodiment, the step of sensing the organic content includes sensing a chemical oxygen demand (COD) concentration of the combined outflow to the downstream wastewater treatment process.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

FIG. 7C shows a legend for the circled numbers of FIG. 7A and FIG. 7B; and

DETAILED DESCRIPTION

Definitions

Organic matter, organically rich material, or organically rich matter—Wastewater entering a waste water treatment plant includes solids ranging from human wastes, hygiene products, solids, and trash to rocks as well as saturated materials beginning to decompose and particulate suspensions. The bio mass of the wastewater is generally referred to herein below as organic matter. Processed portions of the waste water effluent and solids as they exit at various stages of the treatment process contain a certain amount of bio mass (organic content) referred to as an organic load. Technical terms of art for quantitatively evaluating the organic content, such as an organic load, include biochemical oxygen demand content (BOD) and chemical oxygen demand (COD) concentration. Other technical terms of art pertain to the time or time frame for organic matter to biodegrade (biodegradability), such as "rbCOD, rbBOD, sbCOD, sbBOD" sb=slow biodegradability and rb=rapid biodegradability. For example, sbBOD=thickened sludge to the AD because ADs typically have 28-day digestion times and rbBOD to the secondary treatment process as the hydraulic retention time is 8-12-hours typically. rbCOD or rbBOD are typically degradable in 20 to 120-minutes. Organic loads, such as can be delivered from a primary treatment process to a secondary treatment process may be referred by carbon content, digestible content, or bio-degradable content, generally with emphasis on a parameter of importance to the efficiency of the secondary process.

Wastewater effluent entering a primary wastewater treatment facility also typically includes elements and compounds such as ammonia, nitrogen, and phosphorous.

Early-stage and maximum recovery of biochemical oxygen demand content (BOD) serves to both reduce treatment energy consumption and increase energy generation potential. Also, early BOD recovery reduces the solid and fiber load on the downstream membranes/filters. A system and method for efficient early BOD recovery which uses an enhanced primary treatment (EPT) tank to increase the biological concentration in the energy producing effluent from about 0.1% in the prior art to 1% or more is described hereinbelow.

One challenge for waste water treatment plants is how to accommodate the highly variable and often unpredictable flow rate into the facility. Traditionally, this problem has been solved by designing each plant to handle the maximum expected flow. Such solutions based on maximum expected flow typically have less efficient operation during times when they are running well under their maximum capacity, such as when lesser flows are processed. One of the advantages of the EPT concept on which the various embodiments described hereinbelow are based, is that the EPT structures enable flow control, which together with sensors and a process control strategy or a process algorithm, can substantially increase the amount of BOD recovered from the influent early in the treatment process.

Figure 1:
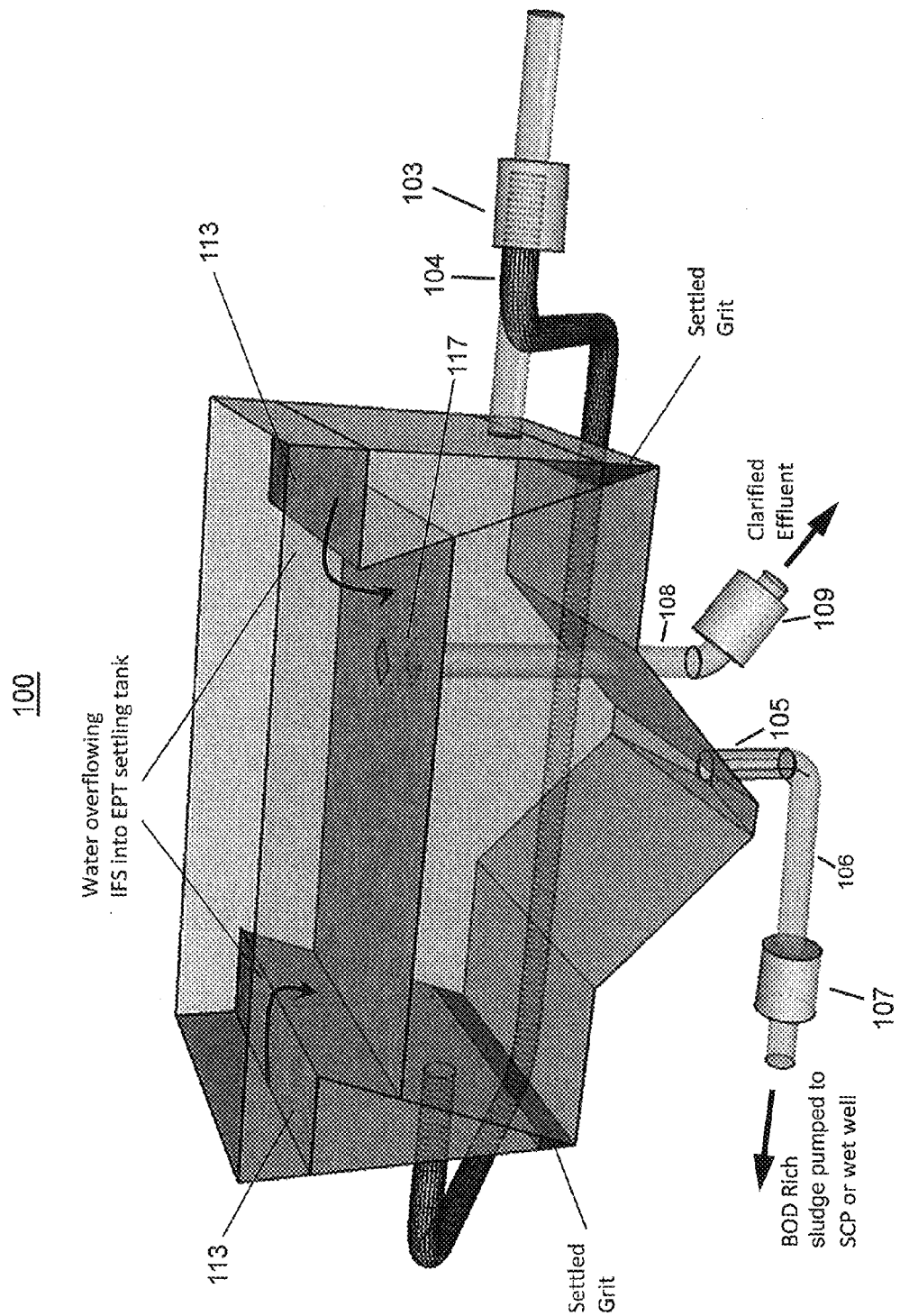
FIG. 1 shows a partial schematic diagram of an exemplary enhanced primary treatment (EPT) tank.

FIG. 1 shows a partial schematic diagram of the basic structure of an exemplary enhanced primary treatment (EPT) tank 100. In the EPT of FIG. 1, influent as wastewater with suspended solids is typically pumped into the influent feed system (IFS) 113 by an influent pump 103 followed by a flow split 104. The exemplary IFS 113 of the EPT of FIG. 1 include two or more troughs attached on the sides of the EPT main tank. Grit, including the highest density solids, settles to the bottom of the IFS while the lighter organics and water flow upward. The lighter organics overflow the lip of the IFS containers into the main tank. When the main tank is full, the tank enters a settling cycle where the organics drift downward concentrating towards the bottom of the tank and collect near a sludge drain 105. Relatively organic free water is then typically removed as effluent from the top of the tank for further filtering (e.g. further filtering by membranes) by gravity and a weir or modulating valve 109, such as via a screen box (SBX) 117 as part of the decanting process. Organic rich water (sludge) is drawn from the bottom of the tank, such as by a sludge pump 107 from sludge drain 105. The resulting high organic content sludge is fed to a digester to generate methane. Various aspects of the EPT tank system were described in co pending U.S. patent application Ser. No. 14/471,247 METHOD AND APPARATUS FOR USING AIR SCOURING OF A SCREEN IN A WATER TREATMENT FACILITY by Wright (the '247 application) which is incorporated herein by reference in their entirety for all purposes.

It was realized that the energy generation efficiency of the EPT can be improved by introducing process control.

Figure 2:
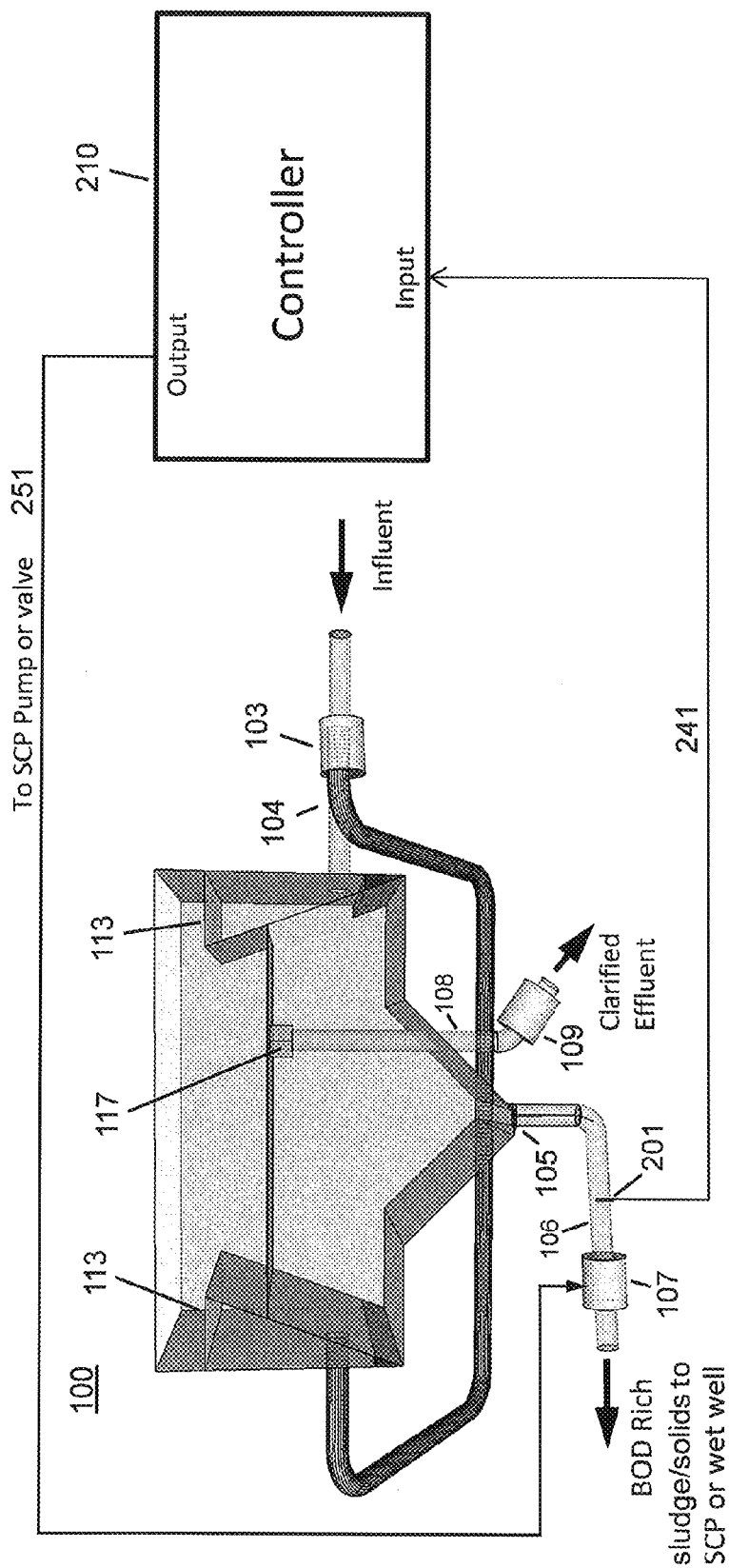
FIG. 2 shows a diagram of an exemplary EPT, sludge sensor, controllable valve or pump, and controller.

FIG. 2 shows a diagram of an exemplary EPT with associated controller 210. In one embodiment a sensor 201, typically a BOD sensor is placed in the sludge discharge pipe 106 that draws the sludge from the bottom of the EPT 100. The sensor is communicatively coupled to a controller via any suitable wired (e.g. cable 241) or wireless means. The valve and/or a pump 107 is also communicatively coupled to the controller 210 via any suitable wired (e.g. cable) or wireless means.

In typical embodiments, the sludge from the bottom of the EPT is sent on to a sludge classifying press (SCP) via a valve and/or a pump 107. The SCP cleans sludge, such as, by removing inorganic solids, and releasing encased organics.

In the embodiment of FIG. 2, the EPT system is usually operated with periods of influent flow and periods of sludge discharge. In a start/stop type EPT operation, there are typically two or more EPT in operation, typically in opposing operations, wherein one is filling while the other is decanting, so that, particularly during times of higher waste flows, waste water influent, usually wastewater, can be diverted to another EPT ready to accept more influent. There can also be EPT systems of one or more EPT tanks where any or all of the EPT tanks are running continuously.

Example

At the start of the draw down from the bottom of the tank, the BOD concentration is high as measured by sensor 201 (typically about 3%, but dependent on factors such as settling time and the initial BOD concentration in the influent). Then, the BOD concentration as measured by sensor 201 decreases as water from higher in the tank reaches the outlet. Eventually the BOD concentration as measured by sensor 201 becomes too low (typically below about 1% for efficient BOD extraction. At this point, the removal of sludge is stopped by controller 210 by closing a valve or turning off pump 107, and any remaining organic poor supernatant is decanted from the top of the tank via SBX 117 and modulating valve 109, and the refilling process of the EPT tank 100 begins again. Thus, based on the BOD concentration input as measured by the sensor 201, controller 210 prevents low energy content liquid from flowing into the de-watering and digesting stages, by controlling valve or pump 107.

Settling times: In some embodiments, control of pumping rate based on BOD concentration measurement also improves settling times. Settling times are improved because the very small organic particles in the influent will naturally coagulate as the particles collide and stick together due to currents and Brownian motion. The larger coagulated particles are more substantial "targets" than the small particle BOD influent, so further coagulation and thus settling occurs faster if some coagulated particles are already present. By sensing the BOD concentration in the effluent pipe and stopping pumping before substantially all of the BOD has been removed, the EPT is "seeded" for the next settling cycle. Using the sensor to control pumping rate thus enables the "seeding" to occur at substantially optimum levels.

Additional sensors can enable still more sophisticated control and hence greater efficiency. For example, by adding flowmeters and one or more additional sensors such as one or more BOD concentration sensors to the influent pipes, the BOD concentration in the EPT tank can be estimated, such as by integration, to establish a substantially optimum settling time for each batch of waste water processed by an EPT tank 100.

Figure 3:
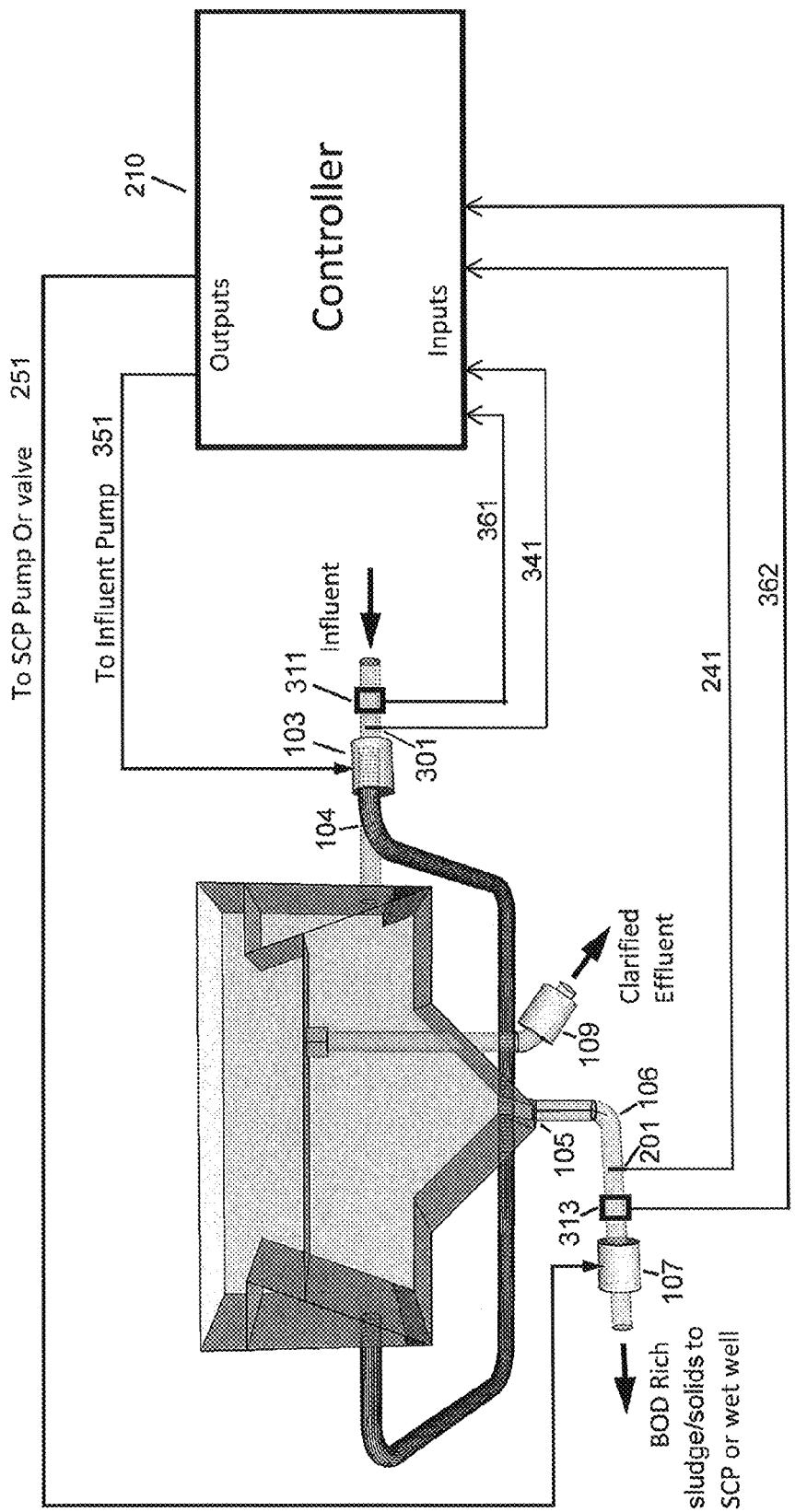
FIG. 3 shows another exemplary embodiment of an EPT tank system which measures both flow rate and BOD at both the influent inlet and at the sludge drain.

FIG. 3 shows another exemplary embodiment of an EPT tank 100 system which measures both flow rate and BOD or TSS at both the influent inlet and at the sludge drain 105 sludge discharge pipe 106. In the embodiment of FIG. 3, the BOD concentration is measured at the sludge drain 105 sludge discharge pipe 106 by sensor 201 which is communicatively coupled to controller 210 as in FIG. 2. Also, valve and/or a pump 107 is also communicatively coupled to the controller 210 as in FIG. 2. A sludge flowmeter 313, which is also communicatively coupled to controller 210 by any suitable means (e.g. cable 362), has been added to measure the flow rate in sludge discharge pipe 106. Also, now influent pump 103 can be controlled by controller 201 (e.g. by cable 351), and another sensor 301 which is communicatively coupled to controller 210 by any suitable means (e.g. cable 341) has been added to the influent inlet pipe 104 as well as a flowmeter 311 which is communicatively coupled to controller 210 by any suitable means (e.g. cable 361) to measure the influent flow rate in influent inlet pipe 104.

In the embodiment of FIG. 3, control is now based on both BOD measurements and flow rate measurements. The flow rate measurements allow controller 210 to calculate how much water is in the EPT tank 100 at any given time. The BOD concentration information from sensor 301 allows the controller to further calculate a quantity of BOD in the EPT tank 100 at any given time based on the concentration of BOD flowing into the EPT tank 100 and the quantity of fluid (typically mostly water) in the EPT tank 100.

Example

The influent flow meter 311 and the sludge flow meter 313, and influent sensor 301 and sludge sensor 201 provide flow rate and sensed measurements (typically TSS BOD concentration) to the controller to provide input data to a process running on the controller 210. In one exemplary embodiment, controller 210 subtracts an effective number of TSS from the Influent number of TSS via the following formula (X-MGD×8.34×Y mg/l). When the concentration of TSS in the tank becomes greater than a set point value, the sludge valve is opened (or an SCP pump is energized). The SCP valve or pump is then later stopped when the TSS in the sludge drops below a field set concentration.

In other embodiments, if sensors are added to the clarified water stream it becomes possible to use mass balance equations to model the EPT tank 100 process and then to control an EPT tank 100 dynamically, such as by using variable speed pumps.

Figure 4:
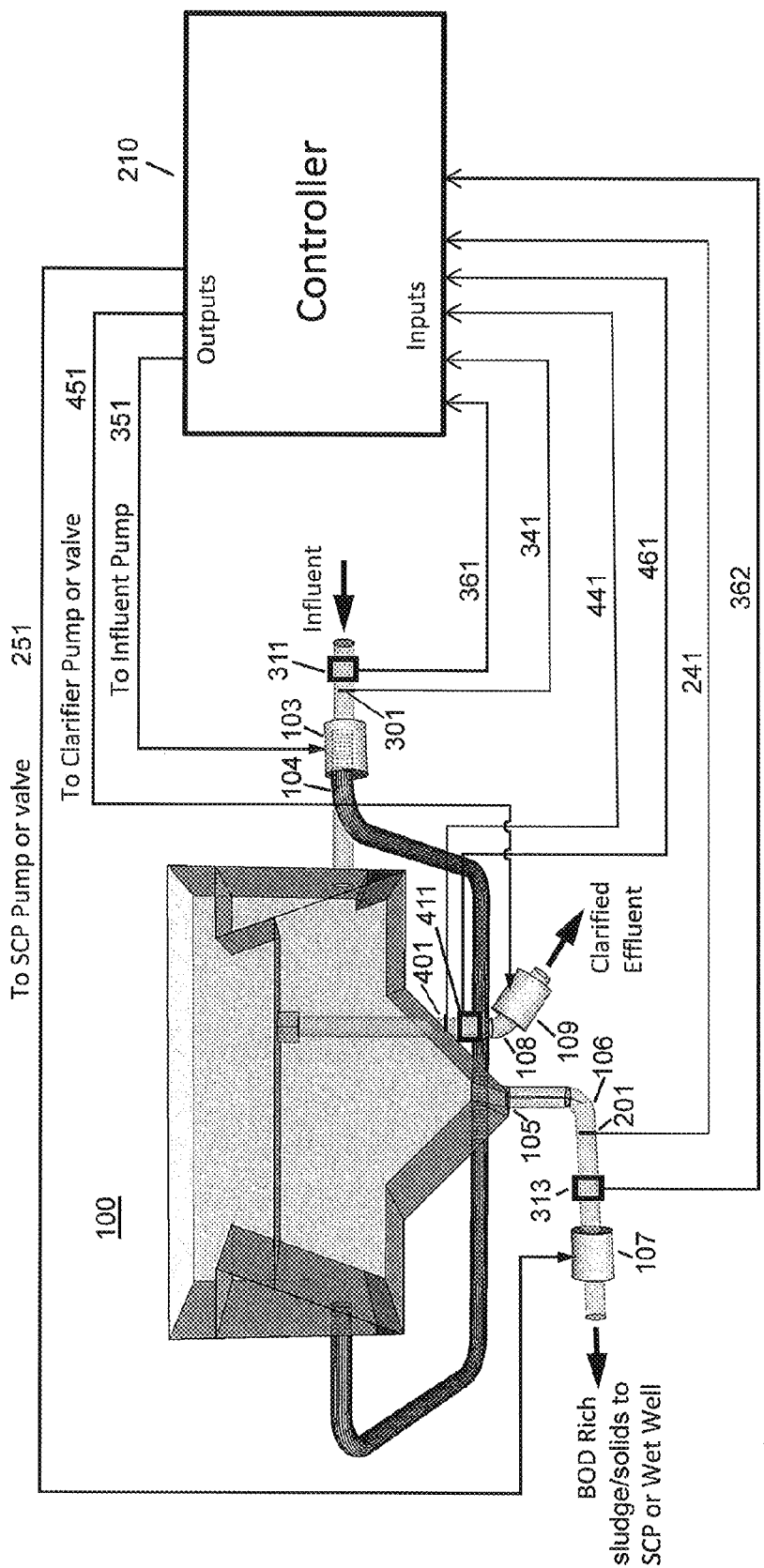
FIG. 4 shows an exemplary embodiment of an EPT tank system with an additional clarified effluent flowmeter and sensor.

FIG. 4 shows an exemplary embodiment of an EPT tank 100 system capable of such proportional control. FIG. 4 adds a sensor 401 which is communicatively coupled to controller 210 by any suitable means (e.g. cable 441) (typically a BOD or COD sensor) to the clarified effluent pipe 108 as well as communicatively coupling control of the modulating valve 109 which controls the flow of clarified effluent decanted from the influent pumped into EPT tank 100. Also, a flowmeter 411 which is communicatively coupled to controller 210 by any suitable means (e.g. cable 461) measures the flow rate of clarified effluent flowing out of EPT tank 100 via the clarified effluent pipe 108. Also, one or more pumps (e.g. influent pump 103) would typically be operable at variable speed for a continuous range of pumping speeds, and or one more valves (e.g. modulating clarified effluent valve 109) can be operated across a range of positions from closed to opened.

In a EPT tank 100 with proportional control, instead of the start/stop operation typical of the system of FIG. 2, influent always flows into the EPT tank 100 at a variable rate determined by a proportional process algorithm running on controller 210 or another computer communicatively coupled to controller 210. Similarly, clarified effluent typically flows continuously from the clarified effluent pipe 108, the instantaneous outflow rate of clarified effluent set by modulating valve 109 as controlled by controller 210. Also, the sludge discharge from sludge drain 105 through sludge pipe 106 can be controlled by valve or pump 107 as controlled by controller 210. Such control it typically executed by controller 210 substantially in real-time according to the process algorithm based on factors, such as, for example, the BOD of the sludge discharge as measured by sensor 201, the BOD of the clarified effluent as measured by sensor 401, and the BOD of the influent as measured by sensor 301. Also, flowmeter 311, flowmeter 313, and flow meter 411 provide input data to controller 210 so that the process algorithm can calculate and track the volume of fluid in EPT tank 100 at any given time.

Example

Controller 210 runs a multi-dimensional process control algorithm which receives as input data from sensor 201, sensor 301, sensor 401, flowmeter 311, flowmeter 313, and flowmeter 411. Such process control algorithms, while believed not to have been previously used in waste water treatment facilities, are well-known in the art of industrial controllers. The EPT tank 100 system has been running in a proportional control mode for some number of hours. The influent is continuously flowing into EPT tank 100 at a certain flow rate. The clarified effluent is flowing out at a certain flow rate, and the sludge is discharging at a certain rate. The volume of fluid (e.g. water with BOD content) in the EPT tank 100 is relatively stable and well below a maximum volume that EPT tank 100 can contain. The total influent is substantially equal to the rate of sludge removal and remove of clarified effluent.

Under proportional control, sensor 201 provides input data on the BOD concentration of the discharging sludge to the process control algorithm running on controller 210. In a hypothetical example, the sensor 201 BOD concentration is increasing causing controller 210 to slightly increase a flow of influent in an attempt to automatically correct the BOD concentration of the discharging sludge back to a desired setpoint or a desired range of BOD concentration. As the rate of influent inflow increases, so does the BOD concentration of the clarified effluent rises as measured by sensor 401. Controller 210 slows the rate of discharge (typically by gravity) of clarified effluent by controlling the modulating valve 109. Also, as the BOD concentration of the sludge discharge begins to fall back to within a desired range, the rate of influent which had been somewhat increased (e.g. by slightly increasing the speed of influent pump 103), can now be slightly reduced, and so on where the controller continuously adjusts flowrates, such as by controlling valve positions and pump speeds throughout the EPT tank 100 system by preprogrammed strategies of the process control algorithm running on controller 210 to maintain a plurality of parameter within desired limits.

Sensing BOD and COD: Chemical oxygen demand (COD) concentration in waste water is understood to include both inorganic particulates and organic matter. COD can be particulate or in solution and/or dissolved. However, because most of the COD in wastewater is typically organic matter, in wastewater applications as described hereinabove, COD can be substantially correlated with BOD. Typically, the method of COD testing is chemical, versus biological for BOD measurements, and thus the scale is different with COD always being at least slightly greater than BOD (because the BOD concentration is a subset of the overall COD concentration).

Violet absorption (Va), Ultraviolet absorption (UVa) sensors, e.g. the UVa spectrometer (UVas), have been found to be reliable sensors for measuring BOD content real-time or near real-time in wastewater applications as described hereinabove. Some prior art COD and/or BOD testing is done at laboratories using waste-water samples and therefore such testing is not suitable for use in a real-time or near real-time control system. However, sensor technologies continue to improve and it is contemplated that more BOD/COD electronic or electro-chemical sensors suitable for real-time or near real-time control applications will be available in the near term. Therefore, in other embodiments, any suitable sensors and sensor methods can be used to measure BOD concentration or BOD content. It is also contemplated that total suspended solids (TSS) sensors, turbidity (TRB) sensors, and chemical oxygen demand (COD) sensors can be used for any of the sensors as described hereinabove.

The systems described hereinabove typically use semi positive displacement or fast start displacement pumps to achieve response times suitable for efficient operation of the control systems described hereinabove. Prior art waste water treatment systems, without any need for fast or precise control generally use centrifugal pumps.

Various components of EPT Tanks and related waste water treatment plants (WWTP) have been described by Wright and ClearCove Systems, Inc. The application incorporates the following United States patents and pending applications that disclose systems and processes for primary clarification. U.S. Pat. No. 7,972,505, PRIMARY EQUALIZATION SETTLING TANK (the '505 patent), to Wright; U.S. Pat. No. 8,225,942 to Wright, SELF-CLEANING INFLUENT FEED SYSTEM FOR A WASTEWATER TREATMENT PLANT; U.S. Pat. No. 8,398,864 SCREENED DECANTER ASSEMBLY FOR A SETTLING TANK (the '864 patent) to Wright; co-pending U.S. patent application Ser. No. 14/142,197 METHOD AND APPARATUS FOR A VERTICAL LIFT DECANTER SYSTEM IN A WATER TREATMENT SYSTEM by Wright (the '197 application); co-pending U.S. patent application Ser. No. 14/142,099 FLOATABLES AND SCUM REMOVAL APPARATUS FOR A WASTE WATER TREATMENT SYSTEM by Wright; co-pending U.S. patent application Ser. No. 14/325,421 IFS AND GRIT BOX FOR WATER CLARIFICATION SYSTEMS by Wright (the '421 application); co-pending U.S. patent application Ser. No. 14/490,944 SYSTEM AND METHOD USING SENSORS TO CONTROL A VERTICAL LIFT DECANTER SYSTEM IN A WATER TREATMENT SYSTEM by Wright (the '944 application); co-pending U.S. patent application Ser. No. 14/503,441 METHOD AND APPARATUS FOR SEPARATING STABLE BIOLOGICAL MATERIALS FROM AN INFLUENT STREAM by Wright (the '441 application); co pending U.S. patent application Ser. No. 14/471,247 METHOD AND APPARATUS FOR USING AIR SCOURING OF A SCREEN IN A WATER TREATMENT FACILITY by Wright (the '247 application); co-pending U.S. patent application Ser. No. 14/503,455 APPARATUS FOR SEPARATING MATERIALS FROM AN INFLUENT STREAM by Wright (the '455 application); co-pending U.S. patent application Ser. No. 14/503,494 APPARATUS FOR ELECTIVELY TREATING SLUDGE TO REMOVE COMPONENTS THEREFROM by Wright (the '494 application); co-pending U.S. patent application Ser. No. 14/503,526 APPARATUS FOR TREATMENT OF SLUDGE by Wright (the '526 application), and co-pending U.S. patent application Ser. No. 14/584,228 SYSTEM FOR CONTROLLING WASTE WATER TREATMENT IN A WASTE WATER TREATMENT PLANT by Wright (the '526 application). Aspects of SCP were described in co-pending U.S. patent application Ser. No. 14/791,289, METHOD FOR USING A SLUDGE CLASSIFYING PRESS TO TREAT SLUDGE by Wright (the '289 application), and co-pending U.S. patent application Ser. No. 14/754,924, A SLUDGE CLASSIFICATION PRESS HAVING A ROTATIONALLY ADJUSTABLE SEPARATION SCREEN by Wright (the '924 application). All of the patents and applications referenced by this paragraph are incorporated herein by reference in their entirety for all purposes.

Improvements in sensing organic matter concentration: The UVAS sensor provides a reliable measurement of organic matter concentration (i.e. BOD concentration). However UVAS sensors are costly. TSS sensors are more robust (e.g. less prone to failure and needs less maintenance) and cost less than UVAS sensors. It was realized that a measurement from a TSS sensor can be used to infer BOD concentration. It was found through field experiments and verification that TSS sensors can be substituted for UVAS sensors to impute reliable BOD concentration values. However in some applications (e.g. in an OH effluent line), a UVAS sensor might provide more consistent and reliable measurement data.

Location of sensor 201, FIG. 4: While a sensor 201 can be disposed at the sludge outflow pipe, it was realized that an alternative location is downstream of the initial sludge dewatering processes, such as, for example, downstream of SCP (not shown in FIG. 4). An advantage of placing a sensor 201 downstream of the initial sludge dewatering processes is that some larger solids that could interfere with the sensor measurement are filtered out before the sensor.

Optimization of Organic Material Flowing from a Primary Treatment Process to a Downstream Treatment Process The systems and methods described hereinabove generally relate to optimizing the recovery of organic materials by the primary wastewater treatment processes. Primary control processes have been described with regard to, for example, biochemical oxygen demand content (BOD) concentration of a sludge discharge from a settling tank of the EPT system. A primary wastewater treatment plant, such as the exemplary EPT system described hereinabove can also provide an organic rich outflow (organic harvester (OH) effluent) to a downstream process, such as a secondary treatment process. The efficiency of a downstream treatment process depends on the organic concentration of the primary OH effluent outflow to the downstream facility. In many instances, such as for example, a downstream process, such as for example, a secondary process based on anaerobic digesters, the carbon concentration of the effluent to the secondary process is important to the efficient operation of the anaerobic digesters.

A problem with prior art treatment plants is that the organic concentration of the OH effluent determines the effectiveness of further decomposition of the OH effluent in downstream processes. The efficiency of the downstream processes vary with change in the organic content and other content of the wastewater effluent flowing into the primary wastewater treatment facility.

In a new approach to wastewater treatment, systems and methods are described which solve the problem of loss of efficiency in downstream processes and which provide a substantially steady organic load by the OH effluent to the downstream processes. Several aspects of the solution are described in more detail hereinbelow. One part of the solution is that the OH effluent is variably combined with another organically rich outflow of a primary treatment process or process closely coupled to the primary treatment facility to supplement the organic matter concentration of the supplemented OH effluent outflow. Another part of the solution is measurement of the organic content at any suitable location from just past the position where the OH effluent is combined with the supplemental organic matter to any suitable downstream location at, or past a secondary treatment process, tertiary treatment process, quaternary, treatment process, etc. Yet another part of the solution is the realization that beyond an organic matter concentration sensor, downstream process can be optimized by varying the organic content of the OH effluent in the same way (by adding supplementary organic matter) in response to measurements of specific chemical components of the OH effluent which affect the efficiency of downstream processes, such as, for example, nitrogen, ammonia, and phosphorous. The efficiency of downstream processes can also be increased by increasing the organic content of the OH effluent in response to measured increased concentrations of such undesirable chemicals in the OH effluent. Similarly, chemical sensors can also be placed at any suitable location downstream of the OH effluent outflow.

In the new approach, computer controls (e.g. one or more controllers) control the calculated amount of supplemental organically rich matter delivered into the OH outflow in response to measurements of at least one or more sensors disposed in the OH outflow effluent at any suitable location downstream of the OH effluent outflow to the downstream processes. At least one or more process algorithms running on at least one or more controllers determine the amount of supplementary rich organic material to be added to the OH outflow from the primary treatment process. In one embodiment, the OH outflow is supplemented to maintain a steady organic load to a downstream process based on a sensor based measurement of the organic material concentration in the combined OH outflow to the downstream process. In other embodiments, the organic material concentration in the combined OH outflow can be further modified in response to a measurement of a chemical in the combined OH outflow, such as, for example, nitrogen, ammonia, and/or phosphorous.

The rich organic material used to supplement and adjust the organic matter concentration of the OH effluent can be derived from any suitable source of rich organic material associated with another organic outflow from a primary treatment facility. For example, in addition to an OH effluent outflow, most primary treatment facilities also have one or more sludge outflows. The sludge outflow is typically treated at or near the primary treatment process to remove liquid. The removed liquid is another source of outflow which still has a relatively high organic matter concentration. Exemplary suitable sludge processes (typically dewatering processes) include without limitation, and of rotary drum thickeners (RDT), gravity thickening apparatus, gravity belt apparatus, and centrifuge apparatus or any combination thereof. The wastewater flowing from such sludge dewatering processes is generally referred to as a filtrate outflow. Any of these types of filtrate outflows are suitable for use in variable combination with a primary treatment facility OH outflow to supplement the organic matter concentration of the OH effluent outflow to one or more downstream water treatment processes.

Figure 8:
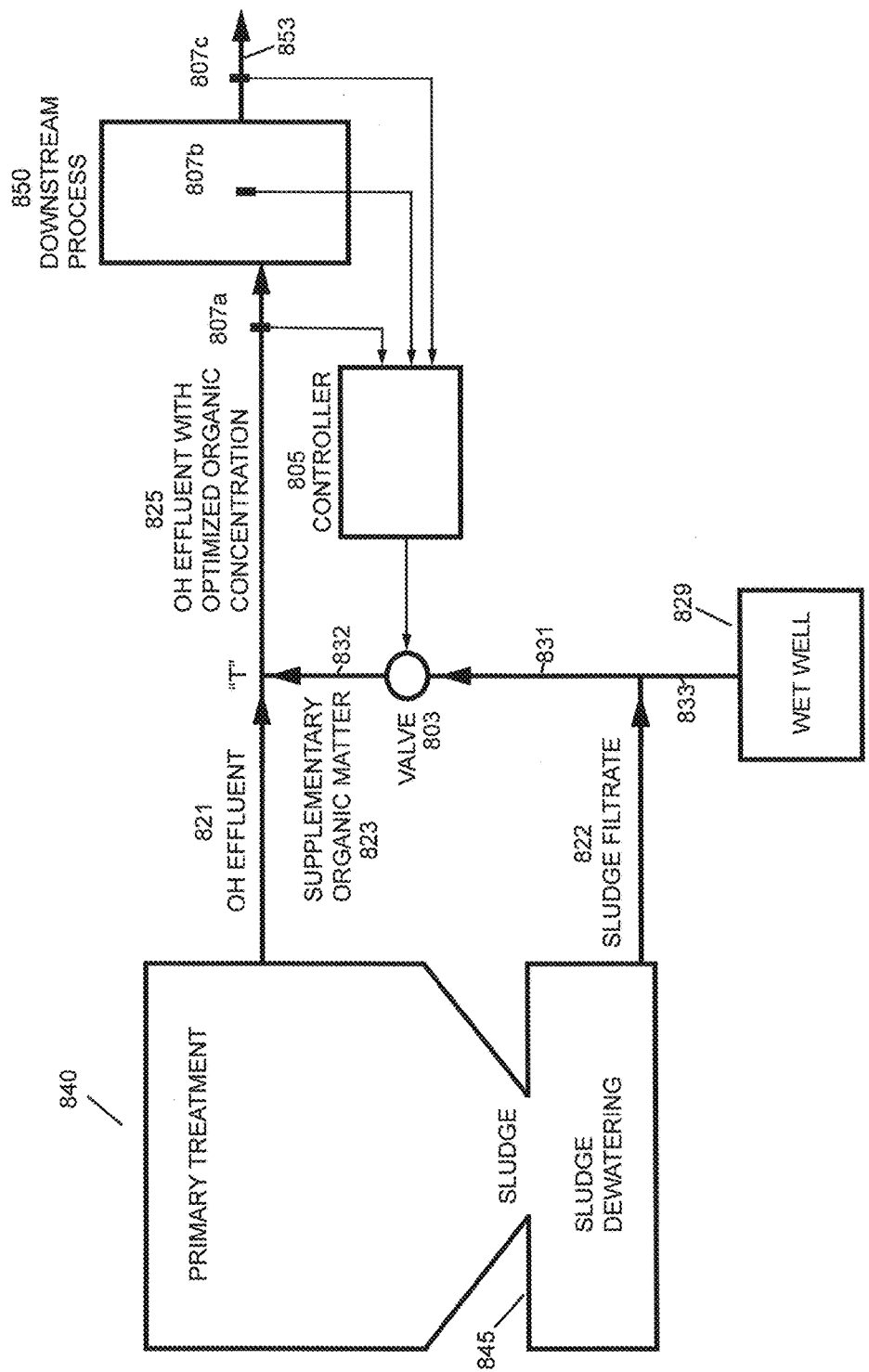
FIG. 8 shows a simplified block diagram illustrating new approach for providing an optimized organic load to the downstream processes.

FIG. 8 shows a simplified block diagram which illustrates aspects of the new approach for providing an optimized organic load to a downstream process. A primary wastewater treatment apparatus 840 has at least an OH outflow 821 and a sludge outflow to a sludge dewatering apparatus 845. As described hereinabove, a sludge filtrate 822 is used to vary the organic matter concentration of OH effluent with optimized organic concentration 825 by variably adding supplementary organic matter 832 from the sludge filtrate 822 at the "T" by setting a position from closed to open of valve 803. Valve 803 is communicatively coupled to and controlled by controller 805. A process algorithm runs on controller 805 and uses as input data measurements from at least one or more of sensors 807a, 807b, 807c, . . . 807n (only one or more of which sensors are present in a system). Typically at least one of the sensors can provide a direct or indirect measurement of the organic matter concentration at the sensor location. Other optional sensors include chemical sensors, such as, for example, a nitrogen sensor, an ammonia sensor, and/or a phosphorous sensor. In some embodiments, a steady organic load is delivered to a downstream process (e.g. downstream process 850). In other embodiments, organic load can be optimized (e.g. increased) to compensate for increased concentrations of a chemical content such as nitrogen, ammonia, or phosphorous. Any of the sensors can be placed at any suitable location, typically between the "T" and any suitable downstream process outflow 853. It is understood that there can be more than one downstream process, such as, for example, where a secondary treatment process feeds a tertiary treatment processes, and so on, until the final outflow from the last process provides water which is pure enough to flow into the receiving body of discharged water, such as a river, lake or ocean.

Any of the processes described herein which adjust the organic matter concentration of the OH effluent can include predictive process algorithms. Predictive programming can prepare or set the wastewater treatment system to deliver organic content to enable biological treatment processes to address cyclical natural (human habits) or scheduled internal treatment processes such as dewatering of solids.

Also, where measurement of BOD concentration and control of BOD concentration is described, there could alternatively be measurement and control of solids. That is, measurements and controls of solids can provide a surrogate for controlling and measuring BOD.

In the detailed examples which follow, exemplary embodiments to illustrate the new systems and methods are described with respect to a primary wastewater treatment facility using an EPT system of one or more EPT tanks as were described hereinabove. Those skilled in the art will understand that it is unimportant what specific types of primary wastewater treatment structures are used to develop and supply the OH effluent outflow from the primary wastewater treatment facility to a downstream process.

EPT systems as described in detail in the patent applications listed hereinabove typically include three output streams. The EPT systems include one to N EPT settling tank systems. Each EPT tank has a sludge outflow from sludge drain 105, an effluent outflow clarified effluent pipe 108, and in many embodiments, another solids/sludge outflow from the influent feed system (IFS) 113 (the IFS outflow is not shown in FIGS. 1-4). While the effluent outflow clarified effluent pipe 108 was labeled as a "clarified" effluent in the description hereinabove, this effluent outflow is clarified only in comparison to the sludge outflow. The effluent from the decanted waster above the sludge in an EPT tank is also rich in organic material. The amount of organic material is related to the height of the screen box (SBX) 117 typically used to draw off effluent, and the settling time of the wastewater in the primary decanting tank. At lower depths there is a relatively higher concentration in the tank fluid. This clarified effluent hereinbelow referred to as "organic harvester (OH) effluent" is typically drawn off for transport by one or more pipes to a downstream treatment processes.

Figure 5:
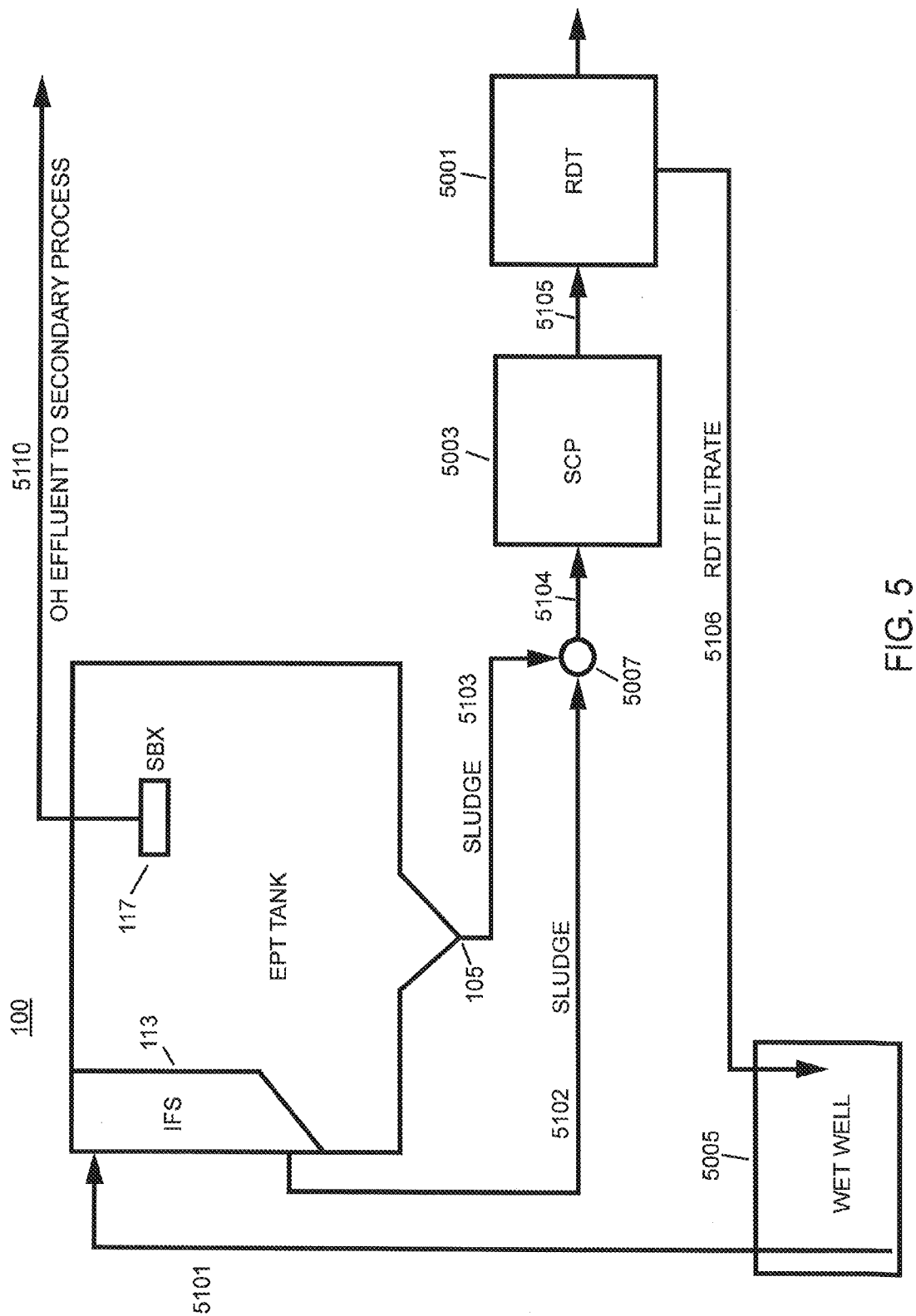
FIG. 5 shows a block diagram of an exemplary EPT system with a rotary drum thickener (RDT)

FIG. 5 shows a block diagram of an exemplary EPT tank based on an EPT tank 100 as described hereinabove. Wastewater from a wet well 5005 enters the EPT tank 100 by pipe 5101 at the IFS 113. Some solids and sludge can be drawn from the IFS via sludge line 5102. Sludge settled at the bottom of the tank which can be drawn off from sludge drain 105 via sludge line 5103. The sludge from both the IFS and the bottom hopper of the tank can be combined by any suitable means such as at a sludge pump 5007. The combined sludge is conveyed to a sludge classification press (SCP) 5003 and then to a rotary drum thickener (RDT) 5001. The RDT filtrate is conveyed, typically by gravity flow, back to the wet well 5005 for re-processing. The still BOD rich wastewater decanting in the EPT tank 100 is drawn off via screen box 117, typically to be sent directly to a secondary treatment process via organic harvester (OH) effluent line 5110. While the OH effluent line is drawn up and to the horizontal in the block diagram, typically OH effluent is removed by gravity (See for example, FIG. 2, 117, 108, and 109). In some embodiments, the flow rate of the OH effluent can be controlled by any suitable valve, such as, for example, a modulating valve downstream and below the SBX, closer to the floor level.

Also, while the exemplary configuration of FIG. 5 shows one EPT tank, there can be 1 to N EPT tanks in an EPT system. Any suitable array of interconnections and valves can be used to convey the various outflows of each of the N EPT tanks to a destination, such as combined sludge flows to an SCP and a RDT or combined OH effluent lines to a common outflow to a secondary process. A multiple tank EPT system was described and shown, for example in U.S. patent application Ser. No. 14/488,552, SYSTEM TO SELF-CLEAN AN IFS USING SUPERNATANT FROM ANOTHER CLARIFICATION TANK by Wright (the '552 application) which is incorporated herein by reference in its entirety for all purposes.

The wastewater being treated by a primary wastewater treatment facility reflects the daily activities of persons and commercial activities served by the facility. For example, in the morning hours as households increasingly discharge into municipal sewage systems there is a distinct rise in nitrogen and ammonia levels caused by the increase in human waste products collected at a municipal waste treatment facility. During the day, there might also be an increase in certain wastes, such as certain types of food waste from factories and commercial operations. In the evening, there can be an increase in wastewater from dishwashers and laundry activities. All of these diurnal human activities change the chemical composition of the waste water flowing into the primary treatment facility.

Some organics are modified by the primary treatment processes in size and composition by both mechanical processes (e.g. screening of various sizes at different stages of the primary process), settling in the decanting tank, and chemical modification, such as by flocculants or other chemical additives. Some components of the primary waste water are typically not modified, such as, for example, ammonia and/or nitrogen levels. Never-the-less, the organic composition of the various outflows from the EPT tanks of an EPT system varies during the day and night, often following a diurnal cycle.

A problem related to the time variation of the primary outflow to a downstream wastewater treatment is that the downstream process efficiency varies with organic content. For example, in some downstream processes, the downstream plant needs to enrich its own inflow, such as by injecting methanol, when organic levels (e.g. carbon concentration levels) fall too low.

It was realized that a more efficient and cost effective solution is to supplement a primary plant outflow with additional bio mass at the primary plant. A solution which provides a substantially steady organic load to a downstream user is described with regard to stabilizing the organic content of an exemplary OH effluent flow to a downstream treatment process.

Figure 6:
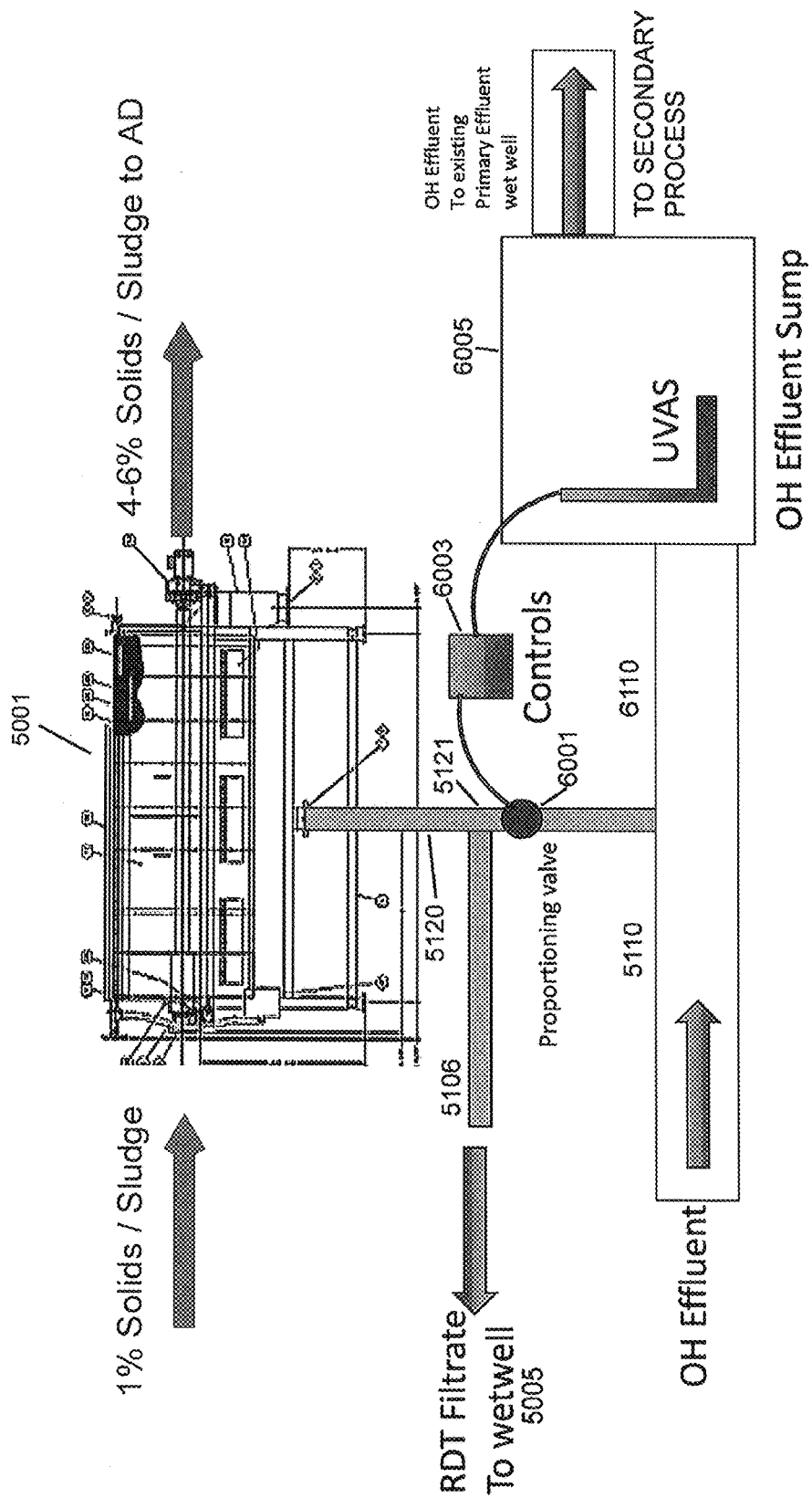
FIG. 6 shows a block diagram of an exemplary EPT system which combines a RDT filtrate with an organic harvester (OH) effluent by use of a proportional valve.

FIG. 6 shows a block diagram of an exemplary EPT system which combines a RDT filtrate with an organic harvester (OH) effluent by use of a proportional valve. The solution is described as a modification of the EPT system of FIG. 5. The OH effluent flow 5110 enters lower right of the drawing. The RDT 5001 is shown at the top center of the drawing. What is different from FIG. 5 is that the RDT filtrate outflow 5120 now flows to a "T" 5121. When proportioning valve 6001 is closed, the RDT filtrate outflow 5120 continues to the wet well 5005 as in FIG. 5. Also, when proportioning valve 6001 is closed, the OH effluent flow 5110 flows to a secondary process, also as in FIG. 5. However, as the proportioning valve 6001 is opened, a portion of the RDT filtrate outflow 5120 now flows through "T" 5121 and the proportioning valve 6001 where it is combined with the OH effluent flow 5110. In the modification of FIG. 6, the OH effluent flow 5110 combined with a portion of the RDT filtrate outflow 5120 flows via line 6110 to a secondary process. By so combining a portion of the RDT filtrate outflow 5120 with the OH effluent flow 5110, the organic concentration of the OH effluent flow 5110 can be increased (supplemented) by the organic rich RDT filtrate outflow 5120.

The UVAS shown in FIG. 6 as disposed in an OH effluent sump 6005, provides a measurement of the organic content concentration of the combined flow in line 6110. Any suitable sensor or measurement system to measure an organic content concentration can be used. In some embodiments, the measurement can provide the chemical oxygen demand (COD) and can be used as an indicia of carbon content. By adding controls 6003, the solution can be automated to provide a substantially constant COD of the combined flow via line 6110 to a secondary process. The controls 6003 (e.g. one or more controllers) are communicatively coupled to both the sensor (e.g. UVAS 6005) and to a valve, such as proportional valve 6001, whereby the controller can set a position of the proportional valve 6001 to valve positions between and including closed and opened valve positions. By comparison to a desired COD of the measure combined flow via line 6110 to a secondary process, for example, a process algorithm running on controls 6003 can command the proportional valve 6001 to a position which provides the desired substantially constant COD. There can be some averaging of the sensor measurement to improve the stability of the organic content control and regulation. It is also understood that there need not be a separate standalone controller and that the function of controls 6003 can be incorporated into an overall control system of the wastewater treatment plant, such as is typically provided as a SCADA control system. While the example shows a proportional valve, any suitable valve or valve system can be used. For example, an open/closed valve could be commanded open for short periods of time to add organic content to the OH effluent flow.

Example

Low COD (below set point) detected by a UVAS and controls 6003 check SCP/RDT operational status. If a part of the EPT system is "off", controls 6003 turns on a solids pump, SCP, RDT 5001 to deliver flow and thus organics in the filtrate from the RDT filtrate 5120. If the COD measured by the sensor does not reach set point in set time frame the valve opens more and continues to open, until the desired COD set point is reached. In some embodiments, if there is an overshoot beyond the desired COD, a high COD process set point causes controls 6003 to command the proportional valve 6001 to start incrementally closing based on time and concentration.

One of the advantages of using RDT filtrate outflow 5120 to enhance the organic content concentration (e.g. COD concentration) of the OH effluent flow 5110 is that the particulate size of the RDT filtrate is typically filtered to a relatively small size within the RDT. For example, in some embodiments, the particulate size is limited to about 1/19"× 1/18", about the size of a grain of sand. This small particulate size is particularly well suited for some downstream process, such as, for example when used to increase the carbon content to a downstream process of an anaerobic digester.

While the exemplary embodiment of FIG. 6 derives supplementary organically rich matter from a RDT filtrate to enhance the BOD concentration of an OH effluent outflow, the RDT is merely representative of such a source of supplementary organically rich matter in a primary wastewater treatment plant. For example, similar organically rich outflows can be provided by other dewatering processes such as gravity thickening, gravity belt, centrifuge, etc.

Example

Figure 7A:
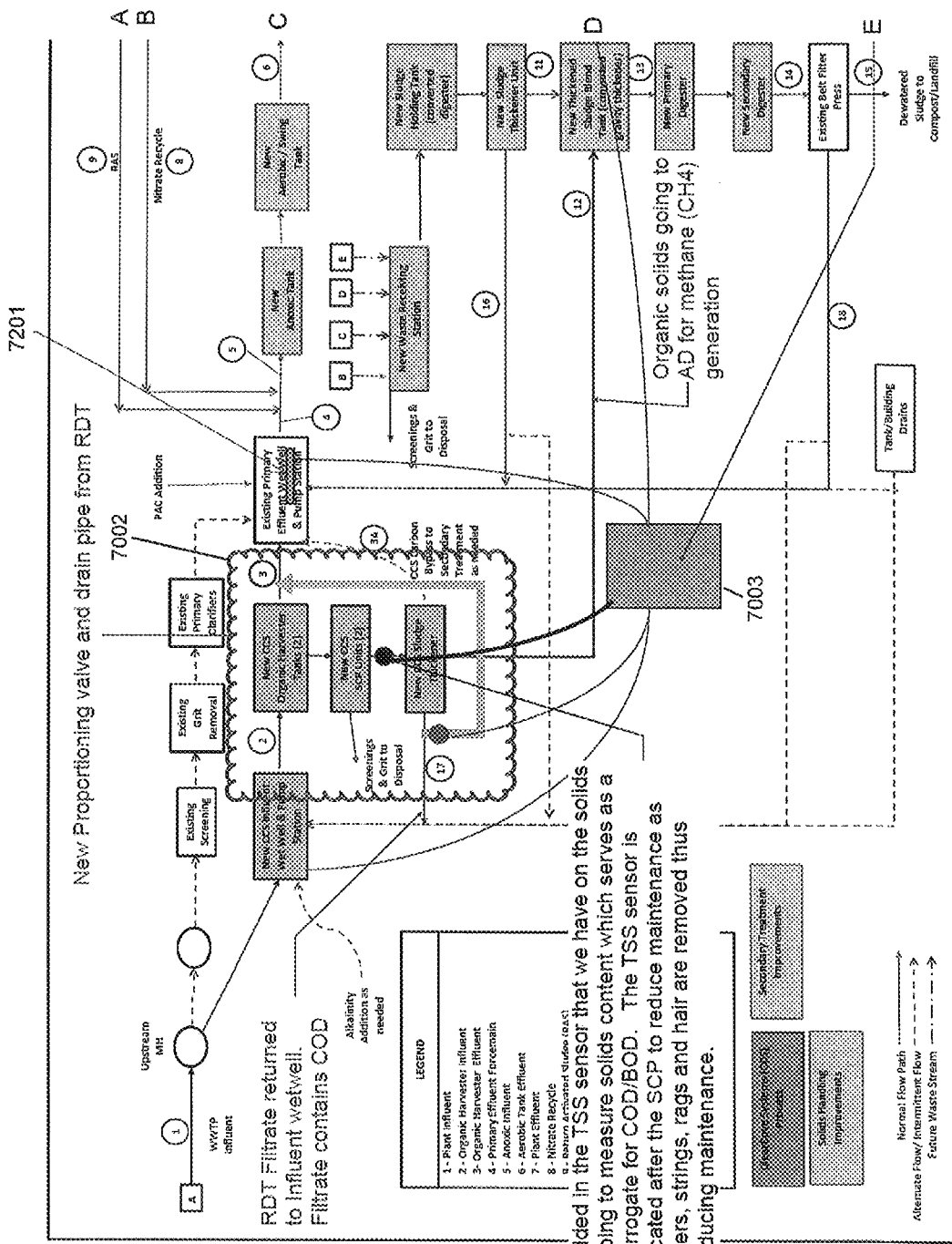
FIG. 7A shows a first page of a block diagram of an exemplary primary and secondary wastewater treatment center according to the principle of FIG. 6.
Figure 7B:
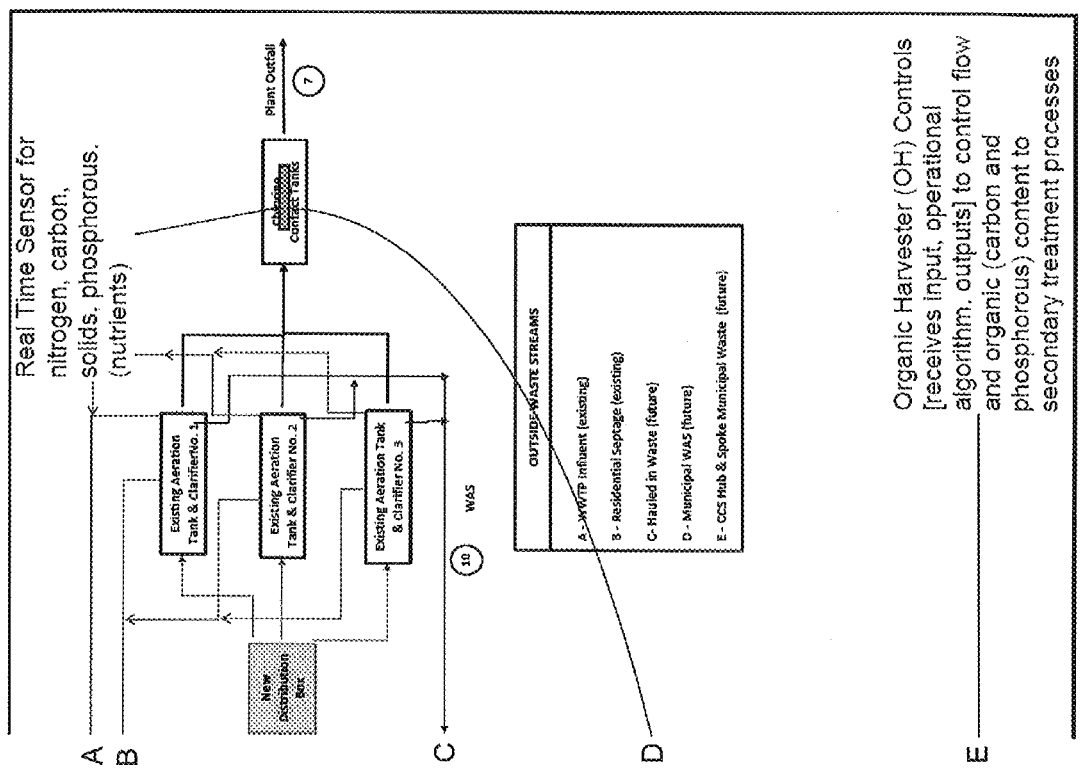
FIG. 7B shows a second page of the block diagram of FIG. 7A.

FIG. 7A, FIG. 7B, and FIG. 7C show a more detailed exemplary primary and downstream wastewater treatment center according to the system and method of FIG. 6. Letters "A" to "E" orient the drawing of FIG. 7A continued onto the page of FIG. 7B. FIG. 7C is the legend for the circled numbers of FIG. 7A and FIG. 7B. Highlighted area 7002 shows the new proportioning valve (e.g. FIG. 6, 6001) and drain pipe from RDT (e.g. FIG. 6, 5120). The block 7003 shows the organic harvester (OH) controls which receive input, operational algorithm, and provides outputs] to control flow and organic (carbon, nitrogen, and/or phosphorous) content to downstream treatment processes. At 7201, real time COD (phosphorous and/or ammonia sensors can be added) is shown in an existing wet well to measure side streams plus OH loadings. In some embodiments, the effluent sump is placed outside of the OH tank (where arrow connects to OH decant) versus in the primary effluent wet well. Real Time COD (it is contemplated that nitrogen, phosphorous and/or ammonia sensors could be added) measurement and control is shown in a wet well to measure side streams plus OH loadings. In this exemplary embodiment, the effluent sump is placed outside of the OH tank (where arrow connects to OH decant) to mount in sump versus existing primary effluent wet well.

A TSS sensor disposed after a SCP can provides the controller 7003, with input on TSS/BOD content of the solids. The controller 7003 closes valves when the concentration gets too low and opens new valves to fresh captured organics in the OH tank based on the sequence/time of last withdrawal. The most recently operated valve will have the lowest COD/TSS content and thus the valve with the longest time since last opened will have the highest COD/TSS/BOD so the controller can go to that valve and work forward.

Side streams and Merger of side streams: In some embodiments, there can be various side streams associated with a primary treatment facility. For example, there can be side streams from other processes such as dewatering, filtering and decanting excess, and decanting liquids. Some of the side streams may contain phosphorous, ammonia, and BOD. Typically such side processes merge at one or more merger points as they leave the primary treatment facility. For example, there could be merger following OH & SCP Thickening processes. Using similar techniques of control and adjustment as described hereinabove (e.g. FIG. 6), a sensor can be placed at or beyond a merger point to measure a combined outflow of organically rich matter typically suspended in a liquid effluent outflow.

Other sensors such a Nitrogen sensor or Ammonia phosphorous sensor: In some embodiments, a nitrogen sensor, and/or an ammonia sensor can be placed at any suitable location related to an organically rich effluent outflow to measure the concentration of generally undesirable components of the outflow. For example, knowing if the nitrogen/ammonia concentration is increasing or decreasing directly and proportionally relates to the need for carbon delivery to the downstream processes. Such carbon can be introduced by increasing or supplementing the organically rich matter added to or combined with the outflow. For example, in process of the type of FIG. 6, in addition to adding organically rich matter in combination in response a lower than setpoint indication of organic matter concentration (e.g. BOD concentration, COD concentration, a TSS measurement), organically rich matter can also be added in response to a detection of higher concentrations of nitrogen and/or ammonia than a nitrogen and/or ammonia setpoint. Such extra or supplemental enrichment of the effluent in response to a another type of measurement (e.g. nitrogen and/or ammonia concentration) can be accomplished by communicatively coupling such sensors to the controller. It is understood that control process algorithms can be suitably modified for the additional response to extra sensors beyond those which measure BOD concentration, COD concentration, and/or TSS measurement.

Example, placement of sensors: One or more sensors can be placed in the influent stream to a downstream treatment process. One difference between placing a sensor only in the OH outflow and placing a sensor in the influent stream to the secondary treatment process is that some existing plants may already deliver side streams to the front of the secondary treatment process. For example, if a belt press is running from 9 AM to 3 PM the organic content in the filtrate from the belt press may use the OH to remove a greater % of COD and phosphorous. Thus, automatically increasing the chemical feed dosing rate can be accomplished using the techniques described hereinabove to reduce the COD and phosphorous concentrations in the OH effluent.

Alternative Embodiment

In an alternative embodiment, the organic concentration of the OH effluent flow 5110 can be varied by adjusting the height of the SBX 117 in the EPT tank 100. As the wastewater effluent in the tank settles, there is a variation of organic material concentration (e.g. COD concentration) from the surface of the liquid suspension (lowest organic concentration) towards the bottom of the tank where sludge settles out and the organic matter concentration is the highest. By varying the height of the SBX, a desired OH effluent flow 5110 can be found. A process control with an organic matter sensor (e.g. a COD measurement) of the extracted of the organic matter concentration and a mechanized means to vary the height of the SBX 117 in the EPT decanting tank can be used to vary the organic concentration of the OH effluent outflow. Any suitable mechanical positioning apparatus can be caused to change SBX 117 height, raising the SBX for a lower organic matter concentration and lowering the SBX 117 for a higher organic matter concentration in the OH effluent outflow. Any suitable mechanized device can be used to position a screen box (SBX) at a height in a decanting tank. Suitable mechanized techniques include, for example, one or more electric motors, hydraulic motors or actuators, and/or pneumatic motors or actuators.

Multiple Methods

It is also contemplated that two or more methods can be used together to control the organic matter concentration of the OH effluent flow. For example, in some embodiments, the OH effluent flow 5110 can be varied by combination of added RDT filtrate, as well as by varying the height of the SBX 117.

A controller as used herein typically includes at least one computer processor. A computer processor, synonymous with microprocessor and processor, typically includes at least one microcomputer, a microcontroller, a digital signal processor (DSP), field programmable array (FPGA) chips, reduced instruction set circuits (RISC), or application specific integrated circuits (ASIC) etc. It is understood that memory used by the microcomputer, including for example instructions for data processing coded and provided from a non-volatile memory or storage as "firmware" which can reside in memory physically inside of a microcomputer chip or in memory external to the microcomputer or in a combination of internal and external memory. It is also understood that a FPGA, RISC, or ASIC can perform controller functions, either in hardware logic, software emulation of a microcomputer, or by a combination of the two. Apparatus having any of the features described herein can operate entirely on one controller or can include more than one controller. Analog input signals can typically be digitized by a standalone analog to digital converter (ADC) or one or more ADCs or multiplexed ADC channels can reside within or be communicatively coupled to the controller. Similarly, a controller can typically generate analog output and control voltage, currents (e.g. industrial 4-20 mA control loops), etc. by use of a digital to analog converter (DAC). Sensors, such as, for example, BOD sensors, can be communicatively coupled to the controller by any suitable wired or wireless means (analog or digital). Controlled equipment, such as, for example, controlled pumps and/or controlled valves can similarly be communicatively coupled to the controller by any suitable wired or wireless means (analog or digital). Some sensors and/or controlled equipment can communicate wired or wirelessly with a controller by any suitable digital interface ranging from serial interfaces such as RS-232, RS485, to Bluetooth™, and WiFi™. In a waste fluid treatment plant either one or more controllers or a general purpose computer communicatively coupled to one or more controllers can execute a SCADA (supervisory, control and data acquisition) program.

General purpose programmable computers useful for controlling plants, facilities, instrumentation, recording signals and analyzing signals or data, such as by being communicatively coupled to one or more controllers according to the present description can be any of a personal computer (PC), a microprocessor based computer, a portable computer, or other type of processing device. The general purpose programmable computer typically comprises a central processing unit, a storage or memory unit that can record and read information and programs using machine-readable non-volatile storage media, a communication terminal such as a wired communication device or a wireless communication device, an output device such as a display terminal, and an input device such as a keyboard. The display terminal can be a touch screen display, in which case it can function as both a display device and an input device. Different and/or additional input devices can be present such as a pointing device, such as a mouse or a joystick, and different or additional output devices can be present such as an enunciator, for example a speaker, a second display, or a printer. The computer can run any one of a variety of operating systems, such as for example, any one of several versions of Windows, or of MacOS, or of UNIX, or of LINUX, etc. Computational results obtained in the operation of the general purpose computer can be stored to a non-volatile memory for later use, and/or can be displayed to a user.

Software and/or firmware for a controller and/or computer coupled to the controller can be provided on a computer readable non-transitory storage medium. A computer readable non-transitory storage medium as non-transitory data storage includes any data stored on any suitable media in a non-fleeting manner. Such data storage includes any suitable computer readable non-transitory storage medium, including, but not limited to hard drives, non-volatile RAM, SSD devices, CDs, DVDs, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for providing an optimized organic load to a downstream wastewater treatment process comprising the steps of:
providing a primary wastewater treatment plant comprising an organic harvester (OH) with an OH effluent output stream with temporal variation in organic content, a sludge filtrate outflow from said primary wastewater treatment plant, a valve controlled by a controller, and a sensor communicatively coupled to said controller, said sensor disposed downstream of a combined outflow line to measure an organic content of a combined outflow to said downstream wastewater treatment process;
sensing said organic content of said combined outflow to said downstream wastewater treatment process;
adjusting said valve controlled by said controller to maintain about a setpoint organic content concentration of said combined outflow to said downstream wastewater treatment process by supplementing said OH effluent output stream with organically rich matter from said sludge filtrate outflow.

2. The method of claim 1, wherein said step of providing a sensor comprises providing an ultraviolet absorption spectrometer (UVAS) sensor.

3. The method of claim 1, wherein said step of providing a sensor comprises providing a TSS or a COD sensor.

4. The method of claim 1, wherein said step of providing a sensor further comprises providing a chemical sensor selected from the group consisting of nitrogen sensor, ammonia sensor, and phosphorous sensor.

5. The method of claim 1, wherein said step of adjusting comprises adjusting said valve to maintain a steady organic matter concentration delivered to said downstream process.

6. The method of claim 1, wherein said step of adjusting comprises adjusting said valve to deliver an optimized organic concentration to said downstream process in response to a measured chemical content of said OH effluent stream.

7. The method of claim 1, wherein said step of sensing comprises sensing a chemical oxygen demand (COD) concentration of said combined outflow to said downstream wastewater treatment process.

8. The method of claim 1, wherein said step of providing a valve comprises providing a proportional valve.

9. The method of claim 8, wherein said step of adjusting said valve comprises proportionally adjusting said proportional valve over a continuous range from closed to open.

10. The method of claim 1, wherein said step of providing an OH effluent output stream comprises providing an organically rich flow from an enhanced primary treatment EPT tank screen box (SBX).

11. The method of claim 1, wherein said step of providing a controller comprises providing a supervisory control and data acquisition (SCADA) controller.

12. The method of claim 1, wherein said step of providing a sludge filtrate outflow from said primary wastewater treatment plant comprises providing a RDT filtrate outflow from a rotary drum thickener (RDT).

13. The method of claim 1, wherein said step of providing a sludge filtrate outflow from said primary wastewater treatment plant comprises providing an organically rich filtrate from a selected one of the group consisting of a gravity thickening apparatus, a gravity belt apparatus, and a centrifuge apparatus.

14. The method of claim 1, wherein said downstream wastewater treatment process comprises an anaerobic digester.

15. The method of claim 1, wherein said step of adjusting said valve comprises adjusting said valve to provide a substantially constant organic load selected from the group consisting of carbon content, digestible content, bio-degradable content, organic content, bio mass, and BOD load.

16. The method of claim 1, wherein said step of adjusting said valve comprises adjusting said valve to compensate for a measured concentration type of the group consisting of nitrogen, ammonia, and phosphorous.

17. The method of claim 1, wherein said step of adjusting said valve comprises adjusting said valve to provide a substantially constant organic load based on a solids measurement.

18. The method of claim 1, wherein said step of providing comprises providing a controller running a predictive process algorithm which predictively adjusts said setpoint organic content concentration to address a cyclical natural human habit or a scheduled internal treatment process.

19. A method for providing a steady organic load to a downstream wastewater treatment process comprising the steps of:

providing a primary wastewater treatment plant comprising an organic harvester (OH) with an OH effluent output stream which varies in organic content over time, a mechanized device to position a screen box (SBX) at a height in a decanting tank where said OH effluent output stream is sourced from said SBX, and a sensor communicatively coupled to a controller, said sensor disposed in a combined outflow line to measure an organic content of a combined outflow to said downstream wastewater treatment process;

sensing said organic content of said combined outflow to said downstream wastewater treatment process;

adjusting said height of said SBX by said controller to maintain an organic content concentration of said OH effluent output stream at about a setpoint organic content concentration value.

20. The method of claim 19, wherein said step of sensing said organic content comprises sensing a chemical oxygen demand (COD) concentration of said combined outflow to said downstream wastewater treatment process.

* * * * *